Patented June 16, 1953

2,642,442

UNITED STATES PATENT OFFICE 2,642,442

CHLOROMETHYLATED ARYLAMINO-BENZANTHRONES

Edgar E. Renfrew, Phillipsburg, N. J., and David I. Randall, Easton, Pa., assignors to General Aniline & Film Corporation, New York, N. Y., a corporation of Delaware No Drawing. Application December 13, 1950, Serial No. 200,688

12 Claims. (Cl. 260—364)

1

This invention relates to novel chloromethylated derivatives of arylaminobenzanthrones, and to a process for their preparation.

Chloromethylation of aromatic compounds, carried out, for example, by reaction of the intermediate aromatic compound with bis-chloromethyl ether, or equivalent chloromethylating reagents, is well known. In the case of aromatic primary and secondary amines, reaction with chloromethylating reagents was observed to proceed readily, but it was not possible to recover simple nuclear chloromethyl-substituted derivatives of the parent amines. This was ascribed to the highly reactive nature of the chloromethyl groups which presumably underwent further reaction with the primary and secondary amino groups.

We have discovered that arylaminobenzanthrones, especially those in which the aryl radical of the arylamino group is a monocyclic radical of the benzene series, having at least one reactive nuclear position of the arylamino group unoccupied, react with bis-chloromethyl ether or equivalent chloromethylating reagents, in concentrated sulfuric acid as a condensing medium, to yield derivatives in which a chloromethyl group or groups are present as nuclear substituents in the arylamino groups, and in some instances also in the benzanthrone nucleus. It has been found that the chloromethyl groups do not condense with any amino group that might be present in the molecule. Chloromethyl-substituted derivatives of the parent compounds are obtained in sufficiently pure form to be used as intermediates for dyestuff preparation, e. g., by conversion to the corresponding quaternary nitrogen base salts or isothiouronium salts of our copending application Serial No. 200,689, filed of even date herewith, such salts constituting valuable dyestuffs for textile materials, especially cellulosic materials.

It is accordingly an object of this invention to provide novel chloromethyl-substituted derivatives of arylaminobenzanthrone compounds, wherein the chloromethyl groups occupy nuclear positions at least in the arylamino radicals, and to provide a process for the preparation of these compounds.

In preparing the chloromethylated derivatives of this invention, bis-chloromethyl ether is added to a solution of an arylaminobenzanthrone compound in concentrated (e. g., at least 95%) sulfuric acid. The reaction mixture is stirred at moderate temperatures, e. g., from 0 to 65° C. The reaction product can be recovered by drowning the mixture in ice water, and filtering out and washing the insoluble product thereby precipitated.

An excess of bis-chloromethyl ether is generally employed, preferably at least 2 moles per mole of the benzanthrone compound.

2

The number of chloromethyl groups introduced into each arylamino group depends on the number, position and nature of substituents already present, and on the reaction conditions such as temperature, concentration and duration. Ordinarily, one chloromethyl group is introduced into the arylamino group in an unoccupied position. In some cases, two chloromethyl groups are introduced, e. g., in the case α-p-toluidinobenzanthrone, and a third chloromethyl group may enter the benzanthrone nucleus in the 6 position.

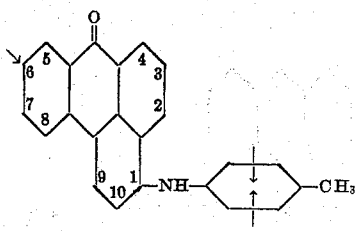

Bz-1-p-toluidinobenzanthrone
(←indicates entering positions)

The aryl radicals of the 1-arylamino groups which undergo chloromethylation can be mono- or polycyclic, e. g., of the benzene, biphenyl, diphenyl methane, anthracene, phenanthrene, or naphthalene series, but are preferably monocyclic aryl derivatives. They can be substituted in one or more nuclear positions by substituents which are unreactive toward the chloromethylating agent under the conditions of chloromethylation, provided that at least one reactive position remains unoccupied. Suitable unreactive substituents are, for example, lower alkyl (e. g., methyl, ethyl) groups, halogen (e. g., chlorine, bromine), and nitro. Reactive positions in the nucleus of the arylamino radical are determined by the position of the benzanthronylamino group and of other substituents present therein, including, for example, the position meta to the benzanthronylamino group, and ortho to halogen or a lower alkyl group.

Arylamino groups of the aforesaid type may occupy one or more of the positions of the benzanthrone nucleus in the compounds subjected to chloromethylation. When more than one such arylamino radical is present, chloromethylation occurs in each of said radicals.

The benzanthrone radical of the compounds employed as starting materials is preferably free of substituents other than the arylamino groups.

The novel compounds of this invention are accordingly nuclear chloromethyl - substituted arylaminobenzanthrones, preferably monocyclic-arylaminobenzanthrones, in which at least one chloromethyl group occupies a nuclear position of an arylamino radical and other chloromethyl groups may occupy positions on either the arylamine or the benzanthrone radical, and, if substituted, contain unreactive substituents such as lower alkyl, lower alkoxy groups, or halogen.

Our invention will be more fully understood from the following examples illustrating preferred embodiments of the invention, wherein parts and percentages are by weight unless otherwise expressed.

Example 1

In a suitable vessel was placed 920.0 parts sulfuric acid (99.7%) and 80.0 bis chloromethyl ether. Then during an hour was added 101.0 parts Bz-1-p-toluidinobenzanthrone. One-half hour after the first portion was put in, another 80.0 parts bis chloromethyl ether was added. The reaction mixture was stirred for two hours after the final addition of Bz-1-p-toluidino-benzanthrone; the temperature throughout the period was 30° C. The solution was poured into 9200.0 parts water and ice. The material which separated was collected on a filter and washed with water until the washings were neutral. The cake was dried; it weighed 100.0 parts. Analysis showed it to have 11.7% chlorine. A product bearing one chloromethyl group has the formula $C_{25}H_{18}ONCl$, $Cl=9.3\%$. The product has the structural formula:

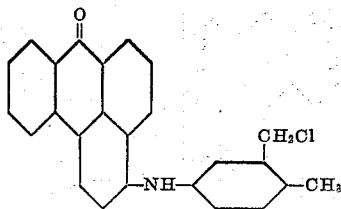

Example 2

In a suitable vessel was placed 920.0 parts sulfuric acid (99.7%) and 160.0 parts bis chloromethyl ether. Then was added 101.0 parts Bz-1-p-toluidinobenzanthrone. The contents of the vessel were maintained at 63° C. for fifteen hours. After cooling, the reaction mixture was drowned in water and ice; the precipitated product was collected on a filter and washed neutral with water. Analysis showed it to have 20.4% chlorine. A product bearing two chloromethyls has the formula $C_{26}H_{19}ONCl_2$; $Cl=16.4\%$; one bearing three chloromethyls has the formula $$C_{27}H_{20}ONCl_3$$

$Cl=22.2\%$. Thus, an average of nearly three chloromethyls per molecule has been introduced. It has been noted that Bz-1-brombenzanthrone under these reaction conditions accepts only one chloromethyl group. Thus, it follows that our new compound has one chloromethyl in the benzanthrone nucleus, and two in the tolyl radical. The structural formula of the product is:

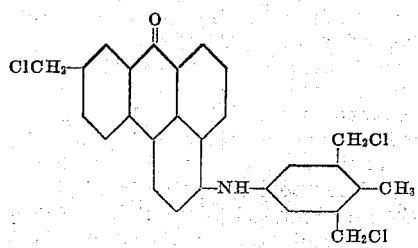

Example 3

Exactly like Example 1, except that 88.0 parts Bz-1,6-di-p-toluidino-benzanthrone was used instead of the Bz-1-p-toluidino benzanthrone. The dried product weighed 15.4% chlorine. A product bearing two chloromethyl groups has the formula $C_{33}H_{26}ON_2Cl_2$; $Cl=13.2\%$. The product has the structural formula:

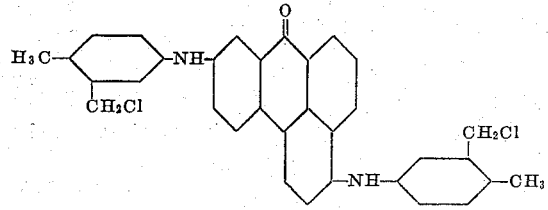

Example 4

Exactly like Example 2, except that 88.0 parts Bz-1,6-di-p-toluidino-benzanthrone was used in place of the Bz-1-p-toluidinobenzanthrone. Analysis showed the product to contain 19.3% chlorine. A product bearing four chloromethyl groups has the formula $C_{35}H_{28}ON_2Cl_4$; $Cl=22.4\%$. The product has the structural formula:

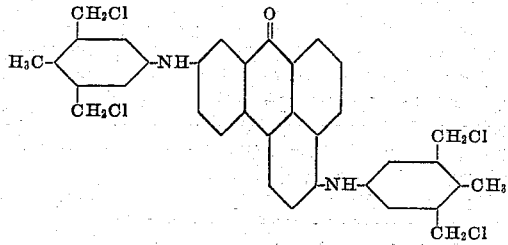

The chloromethylated arylaminobenzanthrones of this invention react with tertiary amines such as pyridine or trimethylamine to form quaternary nitrogen base salts which are soluble in water and which constitute dyestuffs for printing cotton and silk. Similar reaction of the products of this invention with thiourea or its N-alkyl or aryl substitution products yields isothiouronium salts which are likewise soluble in water, and similarly useful for dyeing and printing textiles. The products of the invention also react with phenols such as resorcinol to form the corresponding phenol ethers, which are valuable as spirit-soluble dyestuffs.

Instead of the arylaminobenzanthrone compounds serving as starting materials in the foregoing examples, corresponding arylamino compounds can be employed in which the anilino and p-toluidino radicals of said compounds are replaced by anilino, m-xylidino, p-chloroanilino, p-anisidino, α- or β-naphthylamino, p-benzylanilino, or p-phenyl-anilino radicals. In each case, chloromethyl derivatives of the parent compounds are obtained in which the chloromethyl groups occupy nuclear positions of the arylamino radicals.

Variations and modifications which will be obvious to those skilled in the art can be made in the foregoing procedures hereinbefore specifically described, without departing from the scope or spirit of the invention.

We claim:

1. A nuclear chlormethyl-substituted arylaminobenzanthrone compound wherein at least one chlormethyl group is substituted on the aryl moiety of the arylamino member.

2. A nuclear chlormethyl-substituted Bz-1-monocyclic arylaminobenzanthrone compound wherein at least one chlormethyl group is substituted on the monocyclic aryl moiety of the arylamino member.

3. A nuclear chlormethyl-substituted Bz-1-p-toluidinobenzanthrone having the formula:

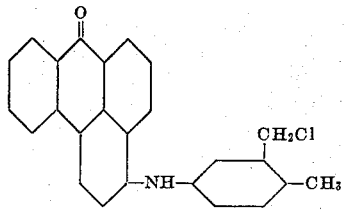

4. A nuclear chlormethyl-substituted Bz-1-p-toluidinobenzanthrone having the formula:

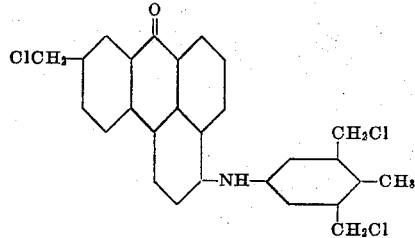

5. A nuclear chlormethyl-substituted Bz-1,6-di-p-toluidinobenzanthrone having the formula:

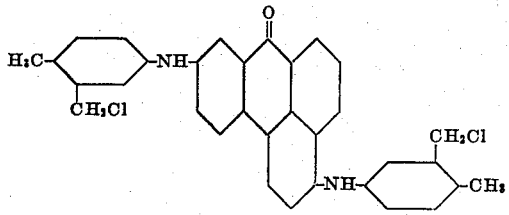

6. A nuclear chlormethyl-substituted Bz-1,6-di-p-toluidinobenzanthrone having the formula:

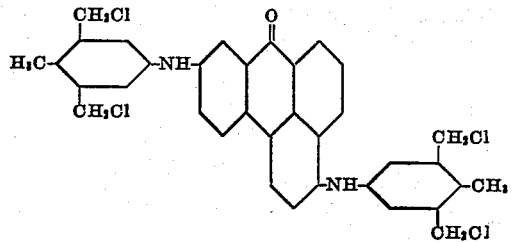

7. The process of producing a nuclear chlormethyl-substituted arylaminobenzanthrone which comprises reacting an arylaminobenzanthrone with a chlormethylating agent in a solution of concentrated sulfuric acid.

8. The process of producing a nuclear chlormethyl-substituted arylaminobenzanthrone which comprises reacting an arylaminobenzanthrone with bis-chlormethyl ether in a solution of sulfuric acid of at least 95% concentration at temperatures of from 0 to 65° C.

9. The process of producing nuclear monochlormethyl Bz-1-p-toluidino-benzanthrone which comprises reacting Bz-1-p-toluidino-benzanthrone with bis-chlormethyl ether in a solution of sulfuric acid of 99.7% concentration at a temperature of 30° C. for a period of approximately two hours.

10. The process of producing nuclear tris-chlormethyl Bz-1-p-toluidino-benzanthrone which comprises reacting Bz-1-p-toluidino-benzanthrone with bis-chlormethyl ether in a solution of sulfuric acid of 99.7% concentration at a temperature of 63° C. for a period of approximately 15 hours.

11. The process of producing nuclear bis-chlormethyl Bz-1,6-di-p-toluidino-benzanthrone which comprises reacting Bz-1,6-di-p-toluidino-benzanthrone with bis-chlormethyl ether in a solution of sulfuric acid of 99.7% concentration at a temperature of 30° C. for a period of approximately two hours.

12. The process of producing nuclear tetra-chlormethyl Bz-1,6-di-p-toluidino-benzanthrone which comprises reacting Bz-1,6-di-p-toluidino-benzanthrone with bis-chlormethyl ether in a solution of sulfuric acid of 99.7% concentration at a temperature of 63° C. for a period of approximately 15 hours.

EDGAR E. RENFREW.
DAVID I. RANDALL.

References Cited in the file of this patent

FOREIGN PATENTS

| Number | Country | Date |
| --- | --- | --- |
| 508,029 | Great Britain | June 23, 1939 |
| 613,982 | Great Britain | Dec. 7, 1948 |
| 613,983 | Great Britain | Dec. 7, 1948 |